United States Patent [19]

Bohannon

[11] Patent Number: 5,177,629
[45] Date of Patent: Jan. 5, 1993

[54] LIQUID CRYSTAL DISPLAY WITH AN OPTICAL FLUID LAYER

[75] Inventor: William K. Bohannon, San Diego, Calif.

[73] Assignee: Proxima Corporation, San Diego, Calif.

[21] Appl. No.: 714,440

[22] Filed: Jun. 13, 1991

[51] Int. Cl.⁵ .............. G02F 1/1335; G02F 1/1333; G02F 1/1339

[52] U.S. Cl. ...................... 359/73; 359/74; 359/81

[58] Field of Search .............. 359/53, 73, 74, 81

[56] References Cited

U.S. PATENT DOCUMENTS 4,443,065  4/1984  Funada et al. ................... 359/53
4,844,569  7/1989  Wada et al. ..................... 359/53
4,924,243  5/1990  Sato et al. ...................... 359/81

FOREIGN PATENT DOCUMENTS 0130532   5/1990  Japan ............................ 359/73
0308225  12/1990  Japan ............................ 359/73

Primary Examiner—Janice A. Howell
Assistant Examiner—Anita Pellman Gross
Attorney, Agent, or Firm—Bernard L. Kleinke; Jerry R. Potts; William Patrick Waters

[57] ABSTRACT

A liquid crystal display panel construction includes a matrix of liquid crystal elements and a layer of optical fluid extending substantially in a plane parallel to the matrix of liquid crystal elements, for improving the optical characteristics of the panel.

12 Claims, 2 Drawing Sheets

LIQUID CRYSTAL DISPLAY WITH AN OPTICAL FLUID LAYER

CROSS-REFERENCE TO RELATED APPLICATIONS

This application relates to copending patent application Ser. No. 07/714,439, filed Jun. 13, 1991, entitled "METHOD OF MAKING A LIQUID CRYSTAL DISPLAY CONSTRUCTION", which is incorporated herein by reference as if fully set forth herein.

TECHNICAL FIELD

The present invention relates generally to liquid crystal display panel constructions, and more particularly to a liquid crystal display panel construction with improved optical characteristics.

BACKGROUND ART

Different types and kinds of liquid crystal display panel systems for producing either single color or multicolored display images, are known. Such display systems may, for example, be employed with overhead or other projectors for projecting the images onto screens, or may serve as computer screens or the like. A typical liquid crystal display (LCD) panel in such a system, includes liquid crystal material, sandwiched between a pair of overlying protective glass panel substrates. Said panel is normally used with other optimal elements such as polarizer lens or other LCD panels. While such LCD panels have been satisfactory for many applications, there have been problems with their use. For example, media differences between the glass elements enclosing the liquid crystal material and other optical components, can cause a less than satisfactory interface between disparate materials in a typical system. As a result, there can be unwanted and undesirable intra element light reflections, refractions and resulting losses. Thus, a less efficient and effective system can result.

In some applications, such undesirable characteristics and losses are accentuated. For example, stacked panels enable colored images to be produced, but stacking increases the number of system elements, thereby also increasing the likelihood of unwanted reflections, refractions and losses. In addition, in some stacked panels, a diminution of light passing through the panels, with a concomitant diminution of color intensity, occurs. In view of the foregoing, it would be highly desirable to have a liquid crystal panel system having elements which could be optically coupled to minimize or at least reduce greatly, intra element light refractions, reflections and losses, and yet provide improved operating characteristics.

In general, the problems of unwanted optical characteristics and resulting losses often present severe limitations in liquid crystal display systems, because of the critical, precise required optical characteristics such panels must usually possess. In a typical nematic LCD panel, whether the panel is utilized in overhead display systems, in computers, or in other applications, scattered incoming light is passed through a polarizer, and an LCD panel causes an electro-optical rotation of the polarized light by a predetermined twist angle, to cause the rotated light to pass through an output polarizer. Moreover, such electro-optic light rotation occurs for each one of a large number of liquid crystal pixel elements individually as they are scanned during each image frame. Thus, as a result of the precise nature of the light path, through the LCD panel, the optics within the panel must be very carefully aligned over the entire area of the matrix area of pixel elements. Thus, any losses or other optical problems with the construction of a typical LCD panel can be enhanced due to the many different light paths being selectively rotated during each scanning cycle, as each small light path is guided through the various optical elements, such as the polarizers and LCD panels.

Moreover, the use of glass substrates can introduce losses in the system. Thus, diminished transmissivity and intensity of desired components of the light can be experienced.

Thus, it is well recognized that liquid crystal display panel systems, especially those systems which include two or more individual LCD panels stacked along a common optical path, frequently exhibit unwanted intra element light reflections, refractions and losses. Therefore, it would be highly desirable to provide an LCD panel construction having elements which are optically coupled in an improved manner to minimize or at least reduce greatly unwanted light reflections, refractions and losses. Such an LCD panel construction should also possess an improved system transmissivity, without sacrificing desired optical properties such as optical retardation, rotation, or spectral filtering. Such a configuration could also be used to augment any of the above optical properties such as retardation or spectral filtering.

DISCLOSURE OF INVENTION

Therefore, it is the principal object of the present invention to provide a new and improved liquid crystal display panel construction and a method of using it, in such a manner as to achieve optically coupled, improved optical characteristics.

It is a further object of the present invention to provide such a new and improved liquid crystal display panel construction to reduce greatly unwanted and undesirable light reflections, refractions, and losses, as well to improve light transmissivity.

Briefly, the above and further objects of the present invention are realized by providing an improved optical coupling for an LCD panel arrangement. A liquid crystal display panel construction includes a matrix of liquid crystal elements and a layer of optical fluid extending substantially in a plane parallel to the matrix of liquid crystal elements, for improving the optical characteristics of the panel.

The present invention affords several advantages. For example, use of the optical fluid results in pronounced reduction in unwanted light reflections, refractions and losses. Also, enhanced color intensity and improved light transmissivity are achieved. In addition, the fluid can be customized with regard to optical anisotrophy and spectral filtering in some cases, thereby permitting the inventive liquid crystal display construction to be augmented to achieve specific desired results.

The optical fluid in the preferred form of the invention, is an optical gel used to serve as an optical coupling, between a pair of LCD panels, or between an LCD panel and some other optical element. The optical gel has an index of refraction, which is similar to the index of refraction of the surfaces being coupled. In the case of a pair of LCD panels, the index of refraction is also matched to any necessary polarizers. The optical connection then is able to provide for a greatly improved light transmissivity through the stacked LCD panel construction, or other such LCD arrangement.

Additionally, the optical gel can contain other optical properties, as required by the design of the LCD system. Such additional properties are optical anisotrophy and spectral filtering with either isotropic dyes or dichroic dyes. The addition of optical anisotrophy to the optical coupling gel enables a stacked LCD panel construction to augment the total birefringence of the LCD panels with additional birefringence from the optical coupling gel and path length (coupling thickness). The augmented birefringence can be used to improve greatly the combined two LCD and coupling gel optical performance, to the specific wavelength of light being switched by the LCD system. For example, stacked systems have been constructed to switch in successive stages of colors, such as red, green and blue light. The birefringence of the optical gel can be used to change the elliptical nature of the polarized light exiting the LCD panel, due to the LCD panel birefringence. Such characteristic can be used to eliminate any unwanted color components, due to the birefringence of the LCD panel, as well as increasing the overall contrast and transmissivity of the panel.

BRIEF DESCRIPTION OF DRAWINGS

The above mentioned and other objects and features of this invention and the manner of attaining them will become apparent, and the invention itself will be best understood by reference to the following description of the embodiments of the invention in conjunction with the accompanying drawings, wherein.

BEST MODE FOR CARRYING OUT THE INVENTION

Figure 1:
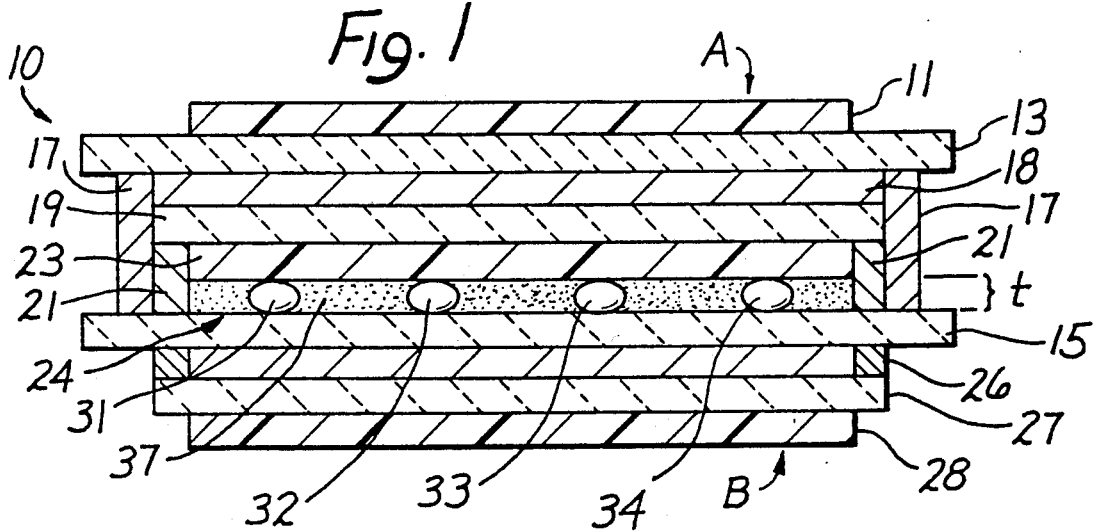
FIG. 1 is a diagrammatic view of a stacked liquid crystal display panel construction, according to the present invention.

Referring to the drawings, and more particularly to FIG. 1 thereof, there is shown a stacked liquid crystal display panel construction 10 of the present invention. The construction 10 includes a pair of liquid crystal display panels A and B. Liquid display panel A includes a polarizer 11, a protective glass substrate plate 13, a layer of liquid crystal material 18 in the form of a matrix of liquid crystal pixel elements, and another protective glass substrate plate 19.

The liquid crystal display panel B includes a protective glass substrate plate 15, a layer of liquid crystal display material 26 in the form of a matrix of liquid crystal pixel elements, another protective glass substrate plate 27 and a polarizer 28. The polarizers, such as the polarizers 11 and 28 are generally mylar sheets which are laminated on the exterior surfaces of the glass substrate panels 11 and 28.

The LCD panels are each assembled and function in a conventional manner. Also, the polarizers are conventional, and function with the LCD panels in a known manner. The panels and polarizers are generally rectangular in shape, and are thin and flat in their configuration, as is well known in the art.

The liquid crystal display panels A and B are fixedly joined together by a peripheral seal 17, which is composed of a suitable elastomeric material. The seal 17 extends between the glass plates 13 and 15, which are substantially larger than the other parts of their respective panels. A spacer 21, extending peripherally adjacent to the seal 17 composed of suitable opaque material, is interposed between the glass substrate plate 19 of panel A and the glass substrate plate 15 of panel B to maintain the panels in a spaced apart relationship. A polarizer 23 is attached to the inner surface of the glass substrate plate 19 and is surrounded peripherally by the spacer 21. The polarizer 23 and the glass substrate plate 15, together with the spacer 21, define a thin, generally rectangular chamber 24.

In addition to the seal 17, a peripheral seal 12 is disposed between the plate 19 and the plate 13 to join the seals and to confine the liquid crystal material 18. Another peripheral seal 22 is disposed between the plate 15 and the plate 27 to join the plate and to confine the liquid crystal material 26. The seals 12 and 22 are similar in composition to the seal 17.

If it is desired to maintain accurate spacing within the chamber, optical spheres, such as the spheres 31, 32, 33 and 34 are disposed randomly within the chamber 24 to maintain uniform spacing between the plates 23 and 15. In accordance with the present invention, an optical fluid in the form of a clear viscous gel material 37, having suitable optical transmissivity characteristics, is disposed within the chamber 24 with the spheres 31, 32, 33 and 34 being impeded therewithin. The gel 37 substantially fills the chamber 24 to form a layer which extends in a parallel, spaced-apart manner relative to the two matrices of liquid crystal elements of the panels A and B to serve as an optical joint to eliminate, or to reduce greatly unwanted light reflections, refractions, or other losses.

The optical spheres, such as the spheres 31, 32, 33 and 34, when disposed within the chamber 24, hold the panels A and B in a predetermined, spaced apart relationship. A plurality of spheres are utilized, and they are distributed randomly in a monolayer, throughout the chamber 24.

The optical spheres are slightly deformable and compressible, each having a diameter which is slightly greater than a desired height t of the chamber 24. In assembling the construction 10, a bead diameter slightly larger than the height t of the chamber 24 is selected so that, when the panels A and B are pressed together during assembly of the system 10 as more fully described in the above referenced copending application, the spheres assume a generally ovoid or flattened shape when they become deformed between the panels A and B. Of course, after assembling the construction, the glass substrates, such as the glass plates 23 and 15, fix the spheres in position by virtue of compression of the spheres by the glass substrates.

Thus, the optical spheres become fixed in a random monolayer distribution within the chamber 24 where they support the system 10 components and aid in maintaining the desired height t of the chamber 24.

In addition to their support and separating functions, the spheres are capable of responding, with the liquid crystal material, to thickness changes resulting from temperature variations.

In one form of the invention, the spheres, in their unstressed condition, are essentially perfectly spherical particles composed of cross linked polymers, principally divinyl benzene, having a specific gravity and thermal expansion coefficient close to that of the optical gel material. A suitable bead is marketed under the trademark MICROPEARL SP. This bead is manufactured by Sekisui Fine Chemical Co. of Japan.

In addition to the spacing and supporting functions described above, the spheres aid in correcting any unevenness of glass substrate surfaces, while maintaining the microscopic uniformity of the liquid crystal layer. The spheres are substantially invisible due to their transparency, and have similar optical transmissivity characteristics to the glass substrates.

In this regard, the optical gel 37 has an index of refraction, which is substantially equal to the index of refraction of the inner surfaces of the stacked and joined panels A and B, the spheres and the polarizers 11 and 28.

If the desired optical characteristics of the construction 10 so require, the gel 37 can be an ordered fluid having anisotropic properties, such as birefringence. In some applications, the gel may be treated to accept an appropriate dichroic dye, thereby imparting dichroic polarizing capabilities to the gel 37 and eliminating the need for a dichroic filter in the construction 10. Thus, the gel has a broad capability for allowing the designer of the construction 10 to change or augment the total birefringence of the construction 10 by adding additional birefringence by modifying the birefringent optical characteristics of the gel 37. Thus, the augmented birefringent characteristics can be utilized to optimize, or at least to improve greatly the function of the combined panels A and B, by matching the optical characteristics of the gel 37 to the specific desired wavelength of light being transmitted. Hence, the gel has significant utility for stacked LCD display systems.

In addition, the birefringence of the gel 37 can be used to change the elliptical nature of polarized light leaving an LCD panel due to the birefringent nature thereof. This characteristic can be used to eliminate unwanted color components, as well as increasing the overall contrast and transmissivity of the LCD panels.

The surface preparation methods depend upon the optical characteristics of the optical coupling gel. If a gel with isotropic optical properties, either in the index of refraction or spectral absorption, is selected, then the surface must be clean and flat to normal tolerances, within the chamber 24. If the gel is chosen to contain anisotropic optical properties such as birefringence or dichroic dyes, then the inner surfaces of the chamber 24 must be prepared to insure that the optical gel molecules align properly to enable the desired use of the optical anisotrophy. This alignment feature can be achieved by either a light chemical etch, or other reaction, or through the use of an additional printed-on polymer alignment layer, similar to that used in conventional LCD manufacturing techniques. Additionally, the outer surface of any necessary polarizers can be used as an alignment layer with a light rubbing technique.

The seal 21 for the optical gel is formed by printing or silk screening on a seal pattern to one or both of the inner surfaces of the chamber of the LCD panels A and B.

In connection with the spacing of the chamber 24, depending upon the type of optical anisotrophies in the optical coupling fluid, the spacing between the LCD panels is somewhat critical. If an optical coupling gel with a very small birefringence is selected, than any normal variations in the coupling chamber does not affect the overall performance, since the optical retardation is the product of the birefringence and the chamber dimension t, with the variations being a small percentage of the chamber dimension t. However, if an optical gel is chosen with a relatively large birefringence, then the dimension t must be small and the variations must be small to prevent nay uneven color variations caused by excessive changes in the overall optical retardation. To maintain the chamber variation in the case where large birefringence gels are employed, the spherical spacers help maintain the desired critical dimension t.

A number of commercially available gels are suitable. For example, gels designated as ZLT-3126, ZLT-2666 and ZLT2804, manufactured by E. Merck Darmstadt are satisfactory. Some of the characteristics of the three gels are depicted in the following Table 1.

TABLE 1

| MIXTURE: | ZLI-3126 | ZLI-2666 | ZLI-2806 |
| --- | --- | --- | --- |
| S—N (°C.) | −7 | <−20 | <−30 |
| Clearing point (°C.) | +63 | +70 | +100 |
| Viscosity (mm$^2$s$^{-1}$) 20° C. | 20 | 45 | 87 |
| Viscosity (mm$^2$s$^{-1}$) 0° C. | 62 | 153 | 200 |
| Viscosity (mm$^2$s$^{-1}$) −20° C. | — | 830 | 1170 |
| Viscosity (mm$^2$s$^{-1}$) −30° C. | — | — | 3700 |
| Viscosity (mm$^2$s$^{-1}$) −40° C. | — | — | cryst. |
| $K_3/K_1$ +20° C. | 1.21 | — | — |
| $K_3/K_2$ +20° C. | 2.3 | — | — |
| $V_{(10,0,20)}$ | 2.74 | DAP 1.7 | DAP 1.9 |
| $V_{(80,0,20)}$ | 3.24 | — | — |
| $V_{(90,0,20)}$ | 4.04 | — | — |
| Temp. dep. (mv/°C.) (0–40° C.) | 22.4 | — | — |
| Temp. dep. (%/°C.) (0–40° C.) | 0.81 | — | — |
| $(V_{60}/V_{10}-1)$ 100(%) | 18.8 | — | — |
| $(V_{90}/V_{10}-1)$ 100(%) | 47.7 | — | — |
| M20 | 1.77 | — | — |
| M0–40 | 2.38 | — | — |
| M0–40 | 1.77 | — | — |

In addition to the gels discussed above, other gels, such as UV11-3, UV11-4M1, UV11-5UV14, UV14-1, UV14-1 and UV15-7 manufactured by Master Bond, Inc. of Hackensak, N.J., are suitable. These gels are viscous and optically clear. In addition, they are good adhesives. Thus, the gels aid in bonding the panels A and B together. Typical properties of the UV15-7 gel are listed in Table 2.

TABLE 2

| | |
| --- | --- |
| Color, uncured compound, 25° C. | colorless transparent |
| Viscosity, uncured compound, cps, 25° C. | 6,000–10,000 |
| Specific gravity, 25° C. | 1.20 |
| Non-volatile content, % | 100 |
| Hardness, Shore D, 25° C. | >50 |
| Tensile strength, psi, 25° C. | 2830 |
| Elongation, %, 25° C. | 10–15% |
| Thermal expansion coefficient/°C. | $18 - 10^{-5}$ |
| Specific resistance, ohm-cm, 25° C. | $1 \times 10^{16}$ |
| Refractive Index | 1.47 |

The foregoing mentioned optical fluids are ordered fluids. A non-ordered optical fluid may also be employed. In this regard, NYOGEL OC-431A marketed by William F. Nye, Inc., of New Bedford, Mass., is a suitable non-ordered optical fluid.

NYOGEL OC-431A optical fluid is a crystal clear, gel-like, optical coupling compound. The presence of air at the junction of the two LCD panels A and B tends to cause significant light refraction due to the large differential optical impedance that exists between air and the panels. Optical coupling fluid OC-431A is formulated with the requisite optical properties of clarity, purity, and refractive index to minimize optical losses.

The following is a Table 3, illustrating the properties of NYOGEL OC-431A, as follows:

TABLE 3

| Color | Crystal Clear |
|---|---|
| Appearance | Smoth, Transparent |
| Refractive Index at 25° C., Sodium D line, 5893A | 1.463 |
| $dN_D/dt$ (−40 to 80° C.) | −0.0003/°C. |
| Dispersion $N_F$-$N_C$ (Hydrogen F Line = 486.1 nanometers; Hydrogen C Line = 656.3 nanometers) | <0.012 |
| Consistency. Unworked Penetration per ASTM D-1403, ¼ Scale | 235 to 265 (Converted to full scale penetration) |
| Oil Separation, 24 hrs at 100° C. | None |
| Evaporation, 24 hrs at 100° C. | 2.8% |
| Dropping Point (Melting Point) | None |
| Specific Gravity at 25° C. | 1.06 |
| Pour Point of Base Oil | −62° C. |
| Viscosity of Base Oil at −29° C. | 23,684 cs |
| Thermal Coefficient of Expansion | 0.0006 cc/cc/°C. |

| Apparent Viscosity as a function of Temperature: Conditions: Brookfield Viscometer Model HBT-2X, 1 RPM, T-A Spindle. | |
|---|---|
| Degrees Centigrade | Poises |
| −40 | 44,373 |
| −20 | 23,360 |
| 0 | 20,576 |
| 25 | 14,880 |
| 40 | 10,656 |
| 80 | 8,160 |

In constructing the LCD panel system of the present invention, standard LCD components are selected, and prepared in order to have a leak tight seal between the LCD components in a stack. The fluid tight volume formed when two LCD panels are joined is then filled with an optical gel having the desired optical properties. Two or more LCD panels can be joined in this fashion, with thin optical gel volumes uniformly disposed between the panels.

In selecting the optical gel for use in the system 10, it is important to select a gel having an index of refraction that reasonably matches the index of refraction of the inner surfaces of the LCD panels, including any polarizers. When such matching is accomplished, optical coupling is achieved, thereby allowing for optimum light transmissivity through the stacked LCD panel system.

In addition to the optical gel qualities discussed above, the optical gel can have other optical properties for a particular design of a stacked LCD system. These additional properties may be optical and anisotropic and spectral filtering, with either isotropic dyes or dichroic dyes. The addition of optical and isotropic dyes to the optical coupling gel allows the system designer to change or augment the total birefringence of the LCD system with additional birefringence from the optical coupling gel and path length (coupling thickness). This augmented birefringence can be used to optimize performance for the specific wavelength of light selected for transmission through the system. For example, stacked systems have been constructed to switch in successive stages through the following colors: red, green and blue.

In addition to the foregoing, the birefringence of the optical gel can be utilized to change the generally elliptical nature of polarized light leaving the LCD panel. This characteristic can be used to eliminate any unwanted color due to birefringence of the LCD panel, as well as increasing the panel's overall contrast and transmissivity.

Figure 2:
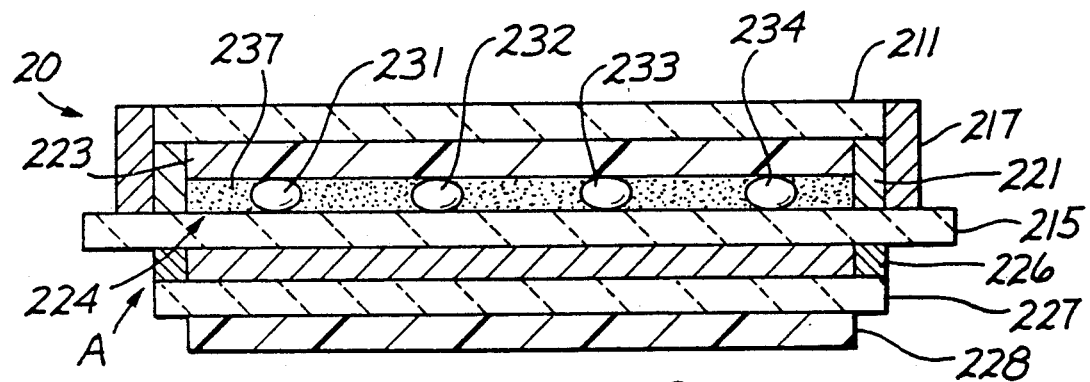
FIG. 2 is a diagrammatic view of a liquid crystal display computer screen construction, according to the present invention.

With reference now to FIG. 2, there is shown a liquid crystal display computer screen construction 20 which is made according to the present invention. The construction 20 is comprised of an LCD panel having glass substrate panels 215 and 227, with a liquid crystal display material 226 disposed therebetween. A polarizer 228 is affixed to the surface of the substrate 227, opposite the liquid crystal material 226. A peripherally disposed spacer 221 separates the substrate panel 215 from a protective glass panel 211. A peripherally disposed elastomeric seal 217 fixes the panel 211 to the panel 215 and provides a fluid tight seal. A polarizer 223, disposed in a manner similar to the polarizer 23 of FIG. 1 is attached to the inner surface of the plate 211. The polarizer 223, spacer 221 and the surface of the glass substrate 215 define a chamber 224. The chamber 224 contains spheres 231, 232, 233 and 234 imbedded in an optical gel 237. The optical gel and the optical spheres are disposed in a manner similar to, and perform a similar function as their respective counterparts of FIG. 1.

In addition to the seal 217, a peripherally disposed seal 222, having a composition similar to that of the seal 217, fixes the substrate 215 to the substrate 227 and confines the liquid crystal material 226.

Figure 3:
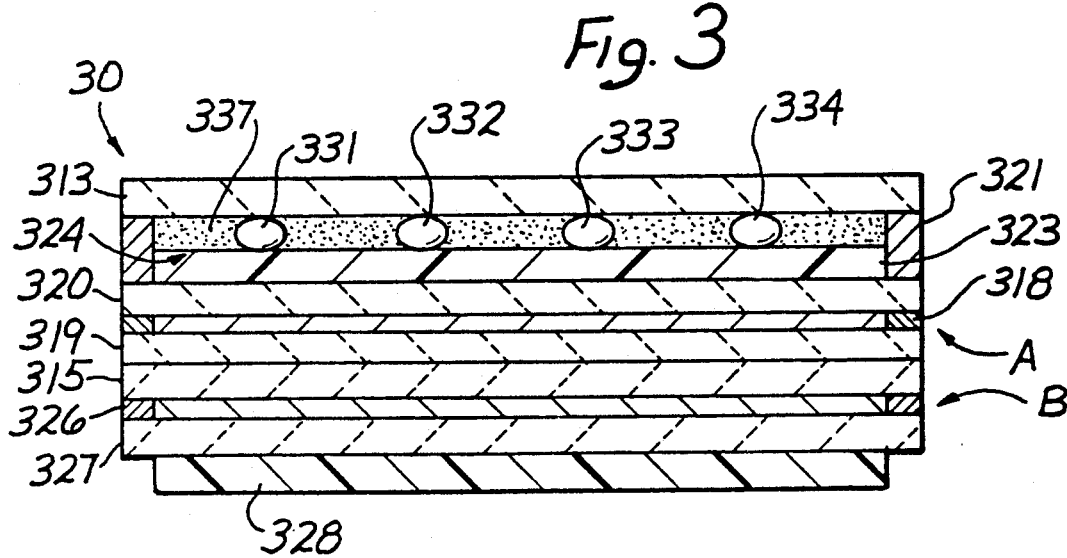
FIG. 3 is a diagrammatic view of a double super twisted liquid nematic display panel computer screen construction constructed according to the present invention.
Figure 4:
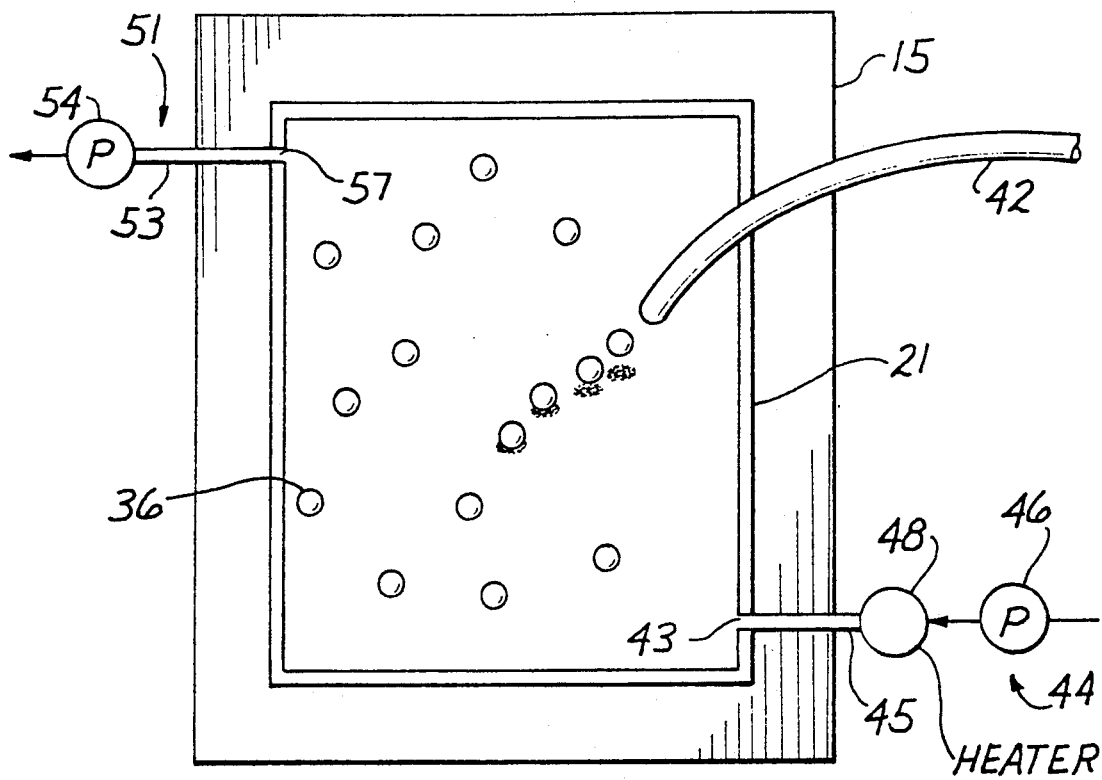
Figure 5:
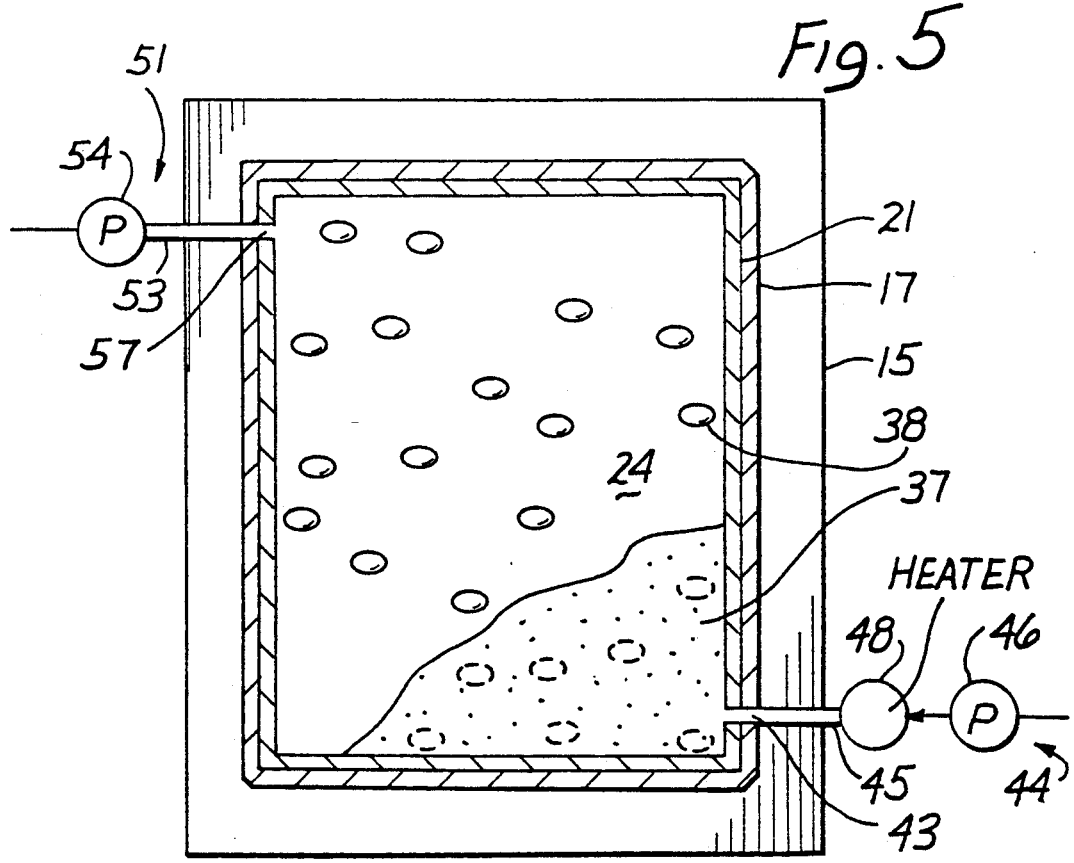

With reference now to FIG. 3 there is depicted a double super twisted liquid nematic display panel computer screen construction 30 which is made according to the present invention. The construction 30 is comprised of a pair of LCD panels A and B. The panel B includes a polarizer 328, a glass substrate panel 327 and a liquid crystal material layer 326 disposed between the substrate 327 and another glass substrate panel 315. The LCD panel A includes a glass substrate panel 319 having one surface in contact with the glass substrate 315. A layer of liquid crystal material 318 is disposed between the substrate 319 and yet another glass substrate 320. A peripherally disposed spacer 321, similar in composition and function to the spacer 21 of FIG. 1, is disposed between the glass substrate 320 and a protective glass plate 313 to form a chamber 324. A polarizer 323 is disposed in the chamber 324 inside the spacer 321. An optical gel material 337 and optical spheres 331, 332, 333 and 334 are disposed within the chamber 324 in a manner similar to, and perform a similar function as their respective counterparts of FIG. 1.

In addition to the seal 317, peripherally dispose 322 and 324, having a composition similar to that of the seal 17 are disposed, respectively, between the substrate 320 and the substrate 319, and the substrates 327 and 317. The seals 322 and 324 fix the respective substrates together and confine, respectively, the liquid crystal material 318 and 326.

While particular embodiments of the present invention have been disclosed, it is to be understood that various different modifications are possible and are contemplated within the true spirit and scope of the appended claims. There is no intention, therefore, of limitations to the exact abstract or disclosure herein presented.

What is claimed is:

1. A liquid crystal display panel construction, comprising:
   display panel means including liquid crystal material means;
   means defining a fluid tight chamber extending in a plane substantially parallel to the liquid crystal display panel means; and
   a layer of optical fluid, said fluid being disposed within said chamber and having a refractive index generally similar to the refractive index of said panel means for improving the optical characteristics of said panel means wherein said fluid is a clear, viscous optical gel.

2. A liquid crystal display panel of claim 1, said means defining a chamber including a plurality of substrate panels.

3. A liquid crystal display panel of claim 2, including deformable spacing spheres for holding said substrate panels in a predetermined relationship to each other, said spheres having optical transmissivity characteristics.

4. A liquid crystal display panel of claim 3, wherein said spacing spheres are composed of cross linked polymers.

5. A liquid crystal display panel of claim 4, wherein said polymer is divinyl benzene.

6. A liquid crystal display panel of claim 1, including a plurality of optical spheres disposed within said chamber and embedded within said fluid for helping to serve as spacers within said chamber.

7. A liquid crystal display panel of claim 1, wherein said fluid is selected from the group consisting of low viscosity adhesives, coatings, sealants, ordered optical fluids, non-ordered optical fluids and mixtures thereof.

8. A liquid crystal display panel of claim 1, wherein said means defining a chamber includes a seal.

9. A liquid crystal display panel of claim 8, wherein said seal is material deposited onto a substrate panel.

10. A liquid crystal display panel of claim 1, wherein said means defining a chamber includes a peripherally disposed spacer.

11. A liquid crystal display panel of claim 1, wherein said fluid is optically anisotropic.

12. A liquid crystal display panel construction, comprising:
    display panel means including liquid crystal material means;
    means defining a fluid tight chamber extending in a plane substantially parallel to the liquid crystal display panel means; and
    a layer of optical fluid, said fluid being disposed within said chamber and having a refractive index generally similar to the refractive index of said panel means for improving the optical characteristics of said panel means wherein said fluid is optically isotropic.

* * * * *